US007929614B2

(12) United States Patent
Cho et al.

(10) Patent No.: US 7,929,614 B2
(45) Date of Patent: Apr. 19, 2011

(54) APPARATUS, MEDIUM, AND METHOD FOR PROCESSING NEIGHBOR INFORMATION IN VIDEO DECODING (75) Inventors: Daesung Cho, Seoul (KR); Sangjo Lee, Suwon-si (KR); Doohyun Kim, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1459 days.

(21) Appl. No.: 11/270,626

(22) Filed: Nov. 10, 2005

(65) Prior Publication Data
US 2006/0098734 A1 May 11, 2006

(30) Foreign Application Priority Data

Nov. 10, 2004 (KR) .................. 10-2004-0091495

(51) Int. Cl.
*H04N 7/12* (2006.01)
*G06K 9/00* (2006.01)
(52) U.S. Cl. ............... 375/240.25; 375/262; 382/251
(58) Field of Classification Search ............ 375/240.16, 375/240.29, 240.24, 262, 240.25; 712/300; 369/275.3; 382/100, 103, 107, 154, 168, 382/181, 232, 233, 251, 254, 274, 275, 276, 382/291, 305
See application file for complete search history.

(56) References Cited

U.S. PATENT DOCUMENTS

| 7,362,810 | B2 * | 4/2008 | Wang | 375/240.29 |
| 7,440,389 | B2 * | 10/2008 | Noda et al. | 369/275.3 |
| 7,499,493 | B2 * | 3/2009 | Linzer | 375/240.16 |
| 7,684,491 | B2 * | 3/2010 | Wang | 375/240.24 |
| 7,697,610 | B2 * | 4/2010 | Yu et al. | 375/240.16 |
| 7,711,938 | B2 * | 5/2010 | Wise et al. | 712/300 |

FOREIGN PATENT DOCUMENTS
KR 10-0218523 5/1997

OTHER PUBLICATIONS

Analysis and Design of Macroblock Pipelining for H.264/AVC VLSI Architecture, Tung-Chien Chen, Yu-Wen Huang, and Liang-Gee Chen, ISCAS 2004.*
Korean Intellectual Property Office Notice to Submit Response Issued Apr. 24, 2006.

* cited by examiner

*Primary Examiner* — Seyed Azarian
(74) *Attorney, Agent, or Firm* — Staas & Halsey LLP (57) ABSTRACT Provided is an apparatus, medium, and method for processing neighbor information in a video decoder that can minimize the number of memory accesses. The apparatus includes a neighbor information providing unit and a storage unit. If at least one spatially neighboring block of a current block exists in memory, the neighbor information providing unit can access information of all neighbor blocks from the memory and provides the accessed information as neighbor information. The storage unit stores the neighbor information provided by the neighbor information providing unit and outputs the stored neighbor information to the plurality of modules.

28 Claims, 7 Drawing Sheets

| NMB[0] | NMB[2] | NMB[4] |
|---|---|---|
| NMB[1] | NMB[3] | NMB[5] |
| NMB[6] | NMB[8] ← CURRENT MACROBLOCK | |
| NMB[7] | NMB[9] | |

FIG. 6B

| NMB[0] | NMB[2] | NMB[4] |
|---|---|---|
| NMB[1] | NMB[3] | NMB[5] |
| NMB[6] | NMB[8] ← CURRENT MACROBLOCK | |
| NMB[7] | NMB[9] | |

FIG. 6C

| NMB[0] | NMB[2] | NMB[4] |
|---|---|---|
| NMB[1] | NMB[3] | NMB[5] |
| NMB[6] | NMB[8] | |
| NMB[7] | NMB[9] ← CURRENT MACROBLOCK | |

FIG. 7

MBF : MB_Field, MBS : MB_Skip, MBE : ei_flag, MBI : intra_block

APPARATUS, MEDIUM, AND METHOD FOR PROCESSING NEIGHBOR INFORMATION IN VIDEO DECODING

CROSS-REFERENCE TO RELATED APPLICATIONS

This application claims the priority of Korean Patent Application No. 10-2004-0091495, filed on Nov. 10, 2004, in the Korean Intellectual Property Office, the disclosure of which is incorporated herein in its entirety by reference.

BACKGROUND OF THE INVENTION

1. Field of the Invention

Embodiments of the present invention relate to an apparatus, medium, and method for processing neighbor information in video decoding, and more particularly, to an apparatus, medium, and method for processing neighbor information in a video decoder that minimizes the number of memory accesses.

2. Description of the Related Art

Figure 1:
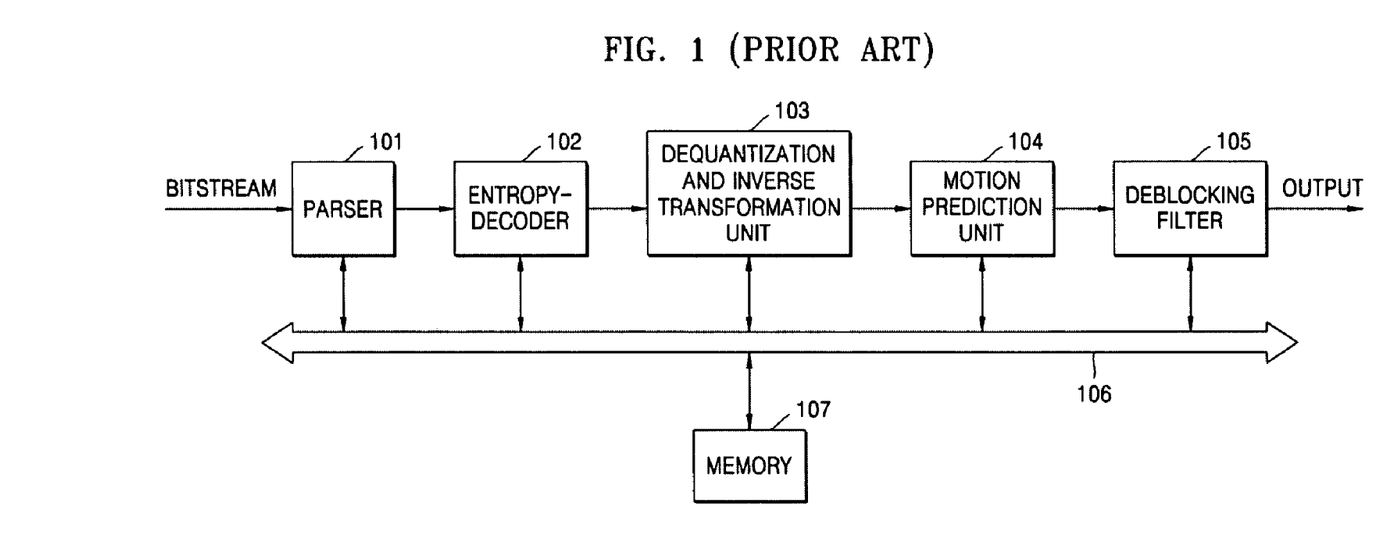
FIG. 1 illustrates a conventional H.264 decoder.

Video decoders decompress images that are encoded in a compressed form. The video decoders are included in such devices as a video codec or an H.264 codec. FIG. 1 illustrates a block diagram of an H.264 decoder included in an H.264 codec.

The H.264 decoder shown in FIG. 1 uses an entropy-decoder 102, a dequantization and inverse transformation unit 103, a motion prediction unit 104, and a deblocking filter 105, in a pipeline form in order to improve its speed. Here, when the entropy-decoder 102 entropy-decodes an $n^{th}$ macroblock, the dequantization and inverse transformation unit 103 dequantizes and inversely transforms an $(n-1)^{th}$ macroblock, the motion prediction unit 104 performs motion prediction on an $(n-2)^{th}$ macroblock, and the deblocking filter 105 performs deblocking-filtering on an $(n-3)^{th}$ macroblock.

These modules, and others such as a parser 101, are supposed to access a memory 107 using a common bus 106. The memory 107 typically store information in macroblock or block units. Thus, the entropy-decoder 102, the dequantization and inverse transformation unit 103, and the motion prediction unit 104, and the deblocking filter 105 access the memory 107 through the common bus 106 when information of spatially neighboring macroblocks or blocks is required.

Figure 2:
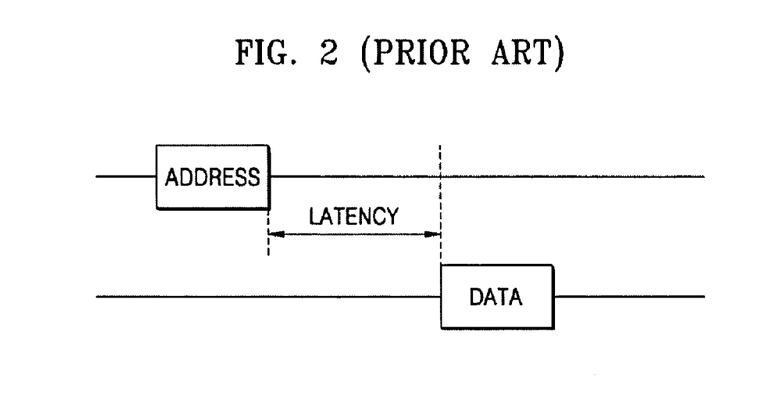
FIG. 2 illustrates a general timing diagram for signals when memory is accessed by the modules in the decoder of FIG. 1.

However, since the modules operate in the form of a macroblock-based pipeline, as described above, several of the modules can access the memory 107 at the same time. Consequently, collisions occur in the common bus 106, resulting in delays in data transmission. Also, such operations by each module has it's own latency, as shown in FIG. 2, from generating an address to access the memory 107 to receiving actual data. The latency ranges from 8 to 9 clock cycles. Such problems inevitably limit improvements in the processing speed of the H.264 decoder.

Also, the bit size of most of the neighbor information that is accessed in the memory 107 is smaller than that of the common bus 106. Thus, as the number of accesses of the memory 107 to obtain the neighbor information increases, the common bus 106 operates less efficiently.

SUMMARY OF THE INVENTION

Embodiments of the present invention provide an apparatus, medium, and method for processing neighbor information in video decoding minimizing the number of memory accesses.

To achieve the above and/or other aspects embodiments of the present invention include an apparatus to process neighbor information in a video decoder having a plurality of modules operating in a pipeline form and a memory storing information in units of at least a block, including a neighbor information providing unit to access respective information of at least one spatially neighboring block of a current block from the memory and provide the information as neighbor information, and a storage unit, distinguished from the memory, to store the neighbor information, provided by the neighbor information providing unit, and output the stored neighbor information to at least one of the plurality of modules for video decoding.

The storage unit may have a structure in which respective registers in the storage unit are assigned to respective modules. In addition, the respective registers may be assigned to the respective modules are consecutively connected.

In addition, the memory may be accessed through a bus of a the video decoder and the storage unit may output the stored neighbor information to the plurality of modules outside of the bus.

Further, when the plurality of modules include a dequantization and inverse transformation module, a motion prediction module, and a deblocking filter module, the storage unit may further include a first register to store respective neighbor information used by the dequantization and inverse transformation module, the motion prediction module, and the deblocking filter module, a a second register to store neighbor information used by the motion prediction module and the deblocking filter module, and a third register to store neighbor information used by the deblocking filter module, wherein the first register transmits respective neighbor information used by the motion prediction module and the deblocking filter module to the second register, and the second register transmits respective neighbor information used by the deblocking filter module to the third register.

The first register, the second register, and the third register may further store information processed in slice units, and the information processed in slice units is provided by a parser included in the video decoder.

The plurality of modules may include an entropy-decoder module, a dequantization and inverse transformation module, a motion prediction module, and a deblocking filter module, with the neighbor information providing unit providing respective neighbor information used by the entropy-decoder module, the dequantization and inverse transformation module, the motion prediction module, and the deblocking filter module.

The neighbor information providing unit may access the memory to store an entropy-decoded result obtained from the entropy-decoder in the memory.

To achieve the above and/or other aspects embodiments of the present invention include an apparatus to process neighbor information in a video decoder having a plurality of modules operating in a pipeline form, and a bus used to access a memory connected to the plurality of modules and to store information in units of at least a block, the apparatus including a neighbor information providing unit to access respective information of spatially neighboring blocks of a current block from the memory via the bus and provide the accessed information as neighbor information, and a storage unit, distinguished from the memory, to store the neighbor information provided by the neighbor information providing unit and output the stored neighbor information to at least one of the plurality of modules for video decoding.

All respective spatially neighboring blocks may be read from the memory as the respective information of the spatially neighboring blocks. In addition, the memory may be accessed through a bus of a the video decoder and the storage unit may output the stored neighbor information to the plurality of modules outside of the bus.

To achieve the above and/or other aspects embodiments of the present invention include a method for processing neighbor information, through a plurality of modules operating in a pipeline form, accessing a memory storing information in units of at least a block, the method including reading respective information of spatially neighboring blocks of a current block from the memory, as respective neighbor information, storing in a storage unit, distinguishable from the memory, the respective neighbor information for respective modules, and transmitting the respective neighbor information from the storage unit to the plurality of modules, respectively, for video decoding.

All spatially neighboring blocks may be read from the memory as the respective information of the spatially neighboring blocks. In addition, the memory may be accessed through a bus of a corresponding video decoder and the storage unit may output the stored neighbor information to the plurality of modules outside of the bus.

When the plurality of modules include a dequantization and inverse transformation module, a motion prediction module, and a deblocking filter module, the transmitting of the neighbor information may include (a) storing in the storage unit respective neighbor information used by the dequantization and inverse transformation module, the motion prediction module, and the deblocking filter module among the read respective neighbor information, (b) storing in the storage unit respective neighbor information used by the motion prediction module and the deblocking filter module among the respective neighbor information of (a), and (c) storing in the storage unit respective neighbor information used by the deblocking filter module among the respective neighbor information of (b). Here, (a), (b), and (c) may be performed in sequence.

To achieve the above and/or other aspects embodiments of the present invention include at least one medium including computer readable code to implement at least an aspect of this method.

To achieve the above and/or other aspects embodiments of the present invention include at least one medium including computer readable code to implement a processing of neighbor information through a plurality of modules operating in a pipeline form, and an accessing of a memory storing at least block-based information, the method including reading respective information of spatially neighboring blocks of a current block from the memory, as respective neighbor information, storing in a storage unit, distinguishable from the memory, the respective neighbor information for respective modules, and transmitting the respective neighbor information from the storage unit to the plurality of modules, respectively, for video decoding.

The memory may be accessed through a bus of a corresponding video decoder and the storage unit may output the stored neighbor information to the plurality of modules outside of the bus.

To achieve the above and/or other aspects embodiments of the present invention include a video decoder means for decoding video through a plurality of module means operating in a pipeline form and a memory means for storing information in units of at least a block, including a means for accessing respective information of at least one spatially neighboring block of a current block from the memory means and for providing the information as neighbor information, and a storage means, distinguished from the memory means, for storing the neighbor information and outputting the stored neighbor information to at least one of the plurality of module means for the decoding of the video.

Additional aspects and/or advantages of the invention will be set forth in part in the description which follows and, in part, will be apparent from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Reference will now be made in detail to embodiments of the present invention, examples of which are illustrated in the accompanying drawings, wherein like reference numerals refer to the like elements throughout. Embodiments are described below to explain the present invention by referring to the figures.

Figure 3:
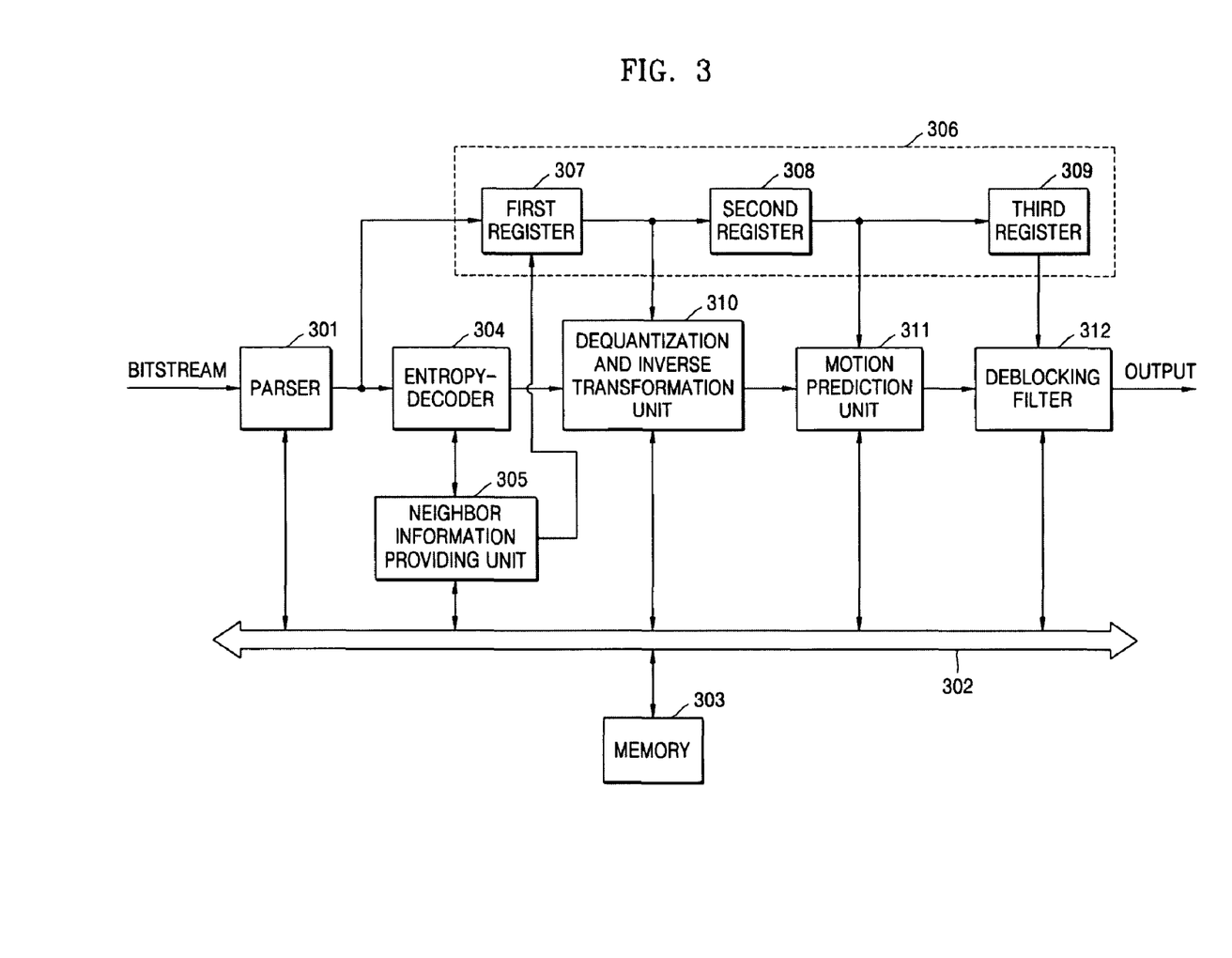
FIG. 3 illustrates a video decoder processing neighbor information, according to an embodiment of the present invention.

FIG. 3 illustrates a video decoder processing neighbor information, according to an embodiment of the present invention. Referring to FIG. 3, the video decoder includes a parser 301, a bus 302, a memory 303, an entropy-decoder 304, a neighbor information providing unit 305, a storage unit 306, a dequantization and inverse transformation unit 310, a motion prediction unit 311, and a deblocking filter 312. The storage unit 306 includes first through third registers 307 through 309.

The video decoder includes the memory 303, but the memory 303 may also be an external buffer of the video decoder, for example. Also, the parser 301, the entropy-decoder 304, the dequantization and inverse transformation unit 310, the motion prediction unit 311, and the deblocking filter 312 operate in a pipeline form.

First, a bitstream input to the video decoder is composed of a video coding layer (VCL) network abstraction layer (NAL) and a non-VCL NAL. The VCL NAL is composed of a slice header and data, and the data is composed of various macroblocks (MB).

The parser 301 parses the bitstream input in the above-described format into slice units, and transmits the parsing result to the first register 307, while providing the same to the memory 303 through the bus 302. The parsing result includes information defined by slice units, such as a slice number. The parser 301 transmits the input bitstream to the entropy-decoder 304.

The entropy-decoder 304 entropy-decodes the received bitstream into macroblock units. At this time, if at least one spatially neighboring macroblock of the current macroblock exists, the entropy-decoder 304 provides identification information of the current macroblock and information indicating the range of the neighboring macroblocks of the current macroblock (e.g., macroblock adaptive frame/field (Mbaff)) to the neighbor information providing unit 305, and entropy-decodes the received bitstream using neighbor information provided by the neighbor information providing unit 305.

The neighbor information providing unit 305 accesses the memory 303 through the bus 302 based on the identification information of the current macroblock and the information indicating the range of the neighboring macroblocks, and then reads information of neighboring macroblocks or 4×4 blocks of the current macroblock.

Figure 4:
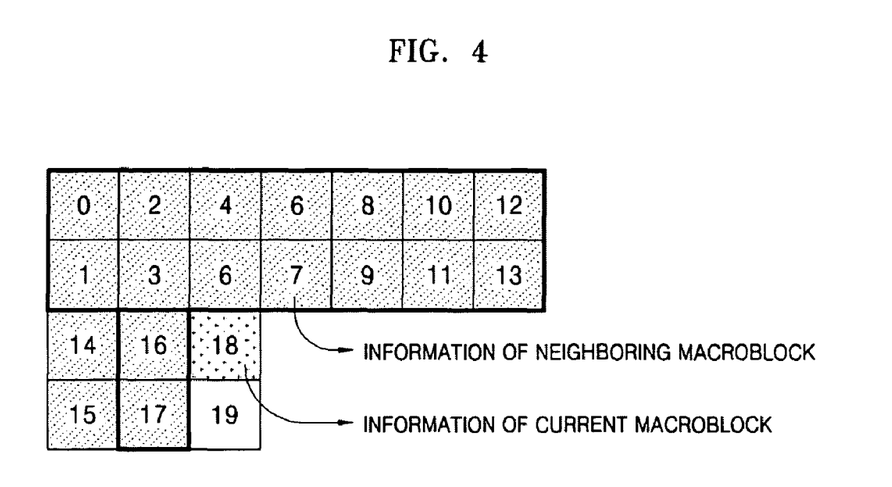
FIG. 4 illustrates an example of selectable neighbor macroblocks of a current macroblock.
Figure 5:
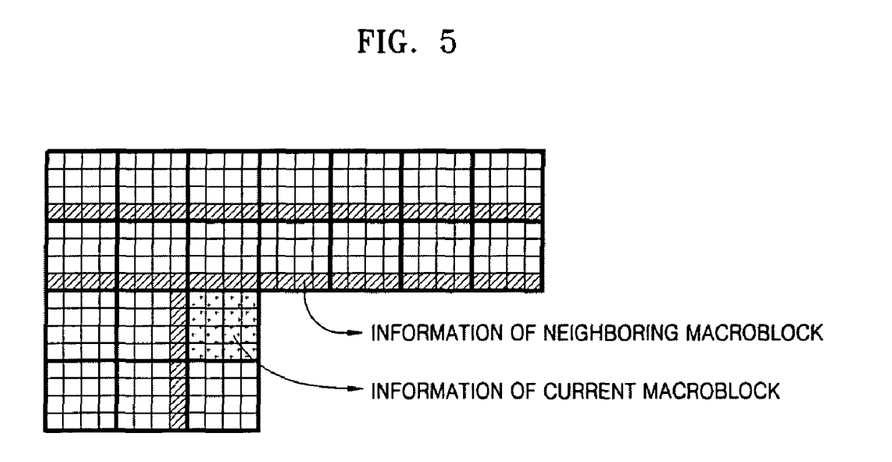
FIG. 5 illustrates an example of the selectable neighbor blocks of a current macroblock.

For example, when a macroblock 18 is the current macroblock, as shown in FIG. 4, the neighbor information providing unit 305 can read information of macroblocks 0 through 13, 16, and 17, for example, from the memory 303. Here, when the current macroblock is a hatched macroblock, as shown in FIG. 5, the neighbor information providing unit 305 can read information of hatched 4×4 blocks from the memory 303.

Figure 6A:
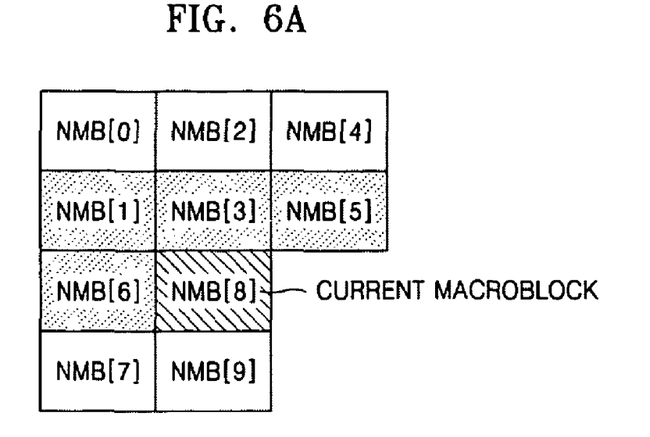
FIGS. 6A through 6C illustrate examples of available information of neighbor macroblocks of a current macroblock.
Figure 6B:
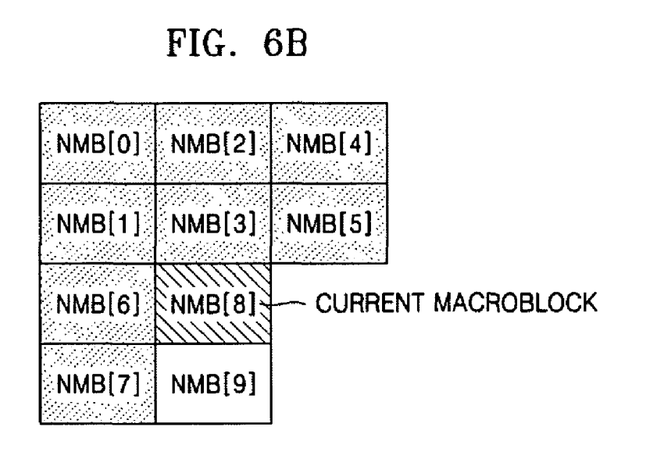
Figure 6C:
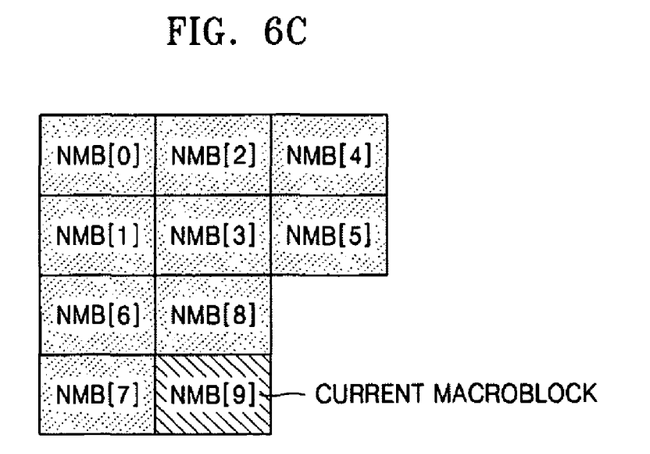

Also, the neighbor information providing unit 305 can select neighboring macroblocks to be read from the memory 303 from among neighboring macroblocks shown in FIG. 4, based on macroblock adaptive frame/field (Mbaff) information provided by the entropy-encoder 304. In other words, if Mbaff is 0, the neighbor information providing unit 305 selects 4 hatched macroblocks NMB[1], NMB[3], NMB[5], and NMB[6] for the current macroblock NMB[8], as shown in FIG. 6A, as neighboring macroblocks to be read from among the neighboring macroblocks shown in FIG. 4, and reads information from the memory 303 in macroblock units. If Mbaff is 1, the neighbor information providing unit 305 selects 8 hatched macroblocks NMB[0], NMB[1], NMB[2], NMB[3], NMB[4], NMB[5], NMB[6], and NMB[7] for the current macroblock NMB[8], as shown in FIG. 6B, or 9 hatched macroblocks NMB[0], NMB[1], NMB[2], NMB[3], NMB[4], NMB[5], NMB[6], and NMB[7], NMB[8] for the current macroblock NMB[9], as shown in FIG. 6C, as neighboring macroblocks to be read from among the neighboring macroblocks shown in FIG. 4, and reads information of the selected macroblocks from the memory 303 in macroblock units.

If the memory 303 is an external buffer, the bus 302 may be defined as an external bus in the H.264 codec. If the memory 303 is included in the video decoder, the bus 302 may be defined as an internal bus in the H.264 codec, for example.

Figure 7:
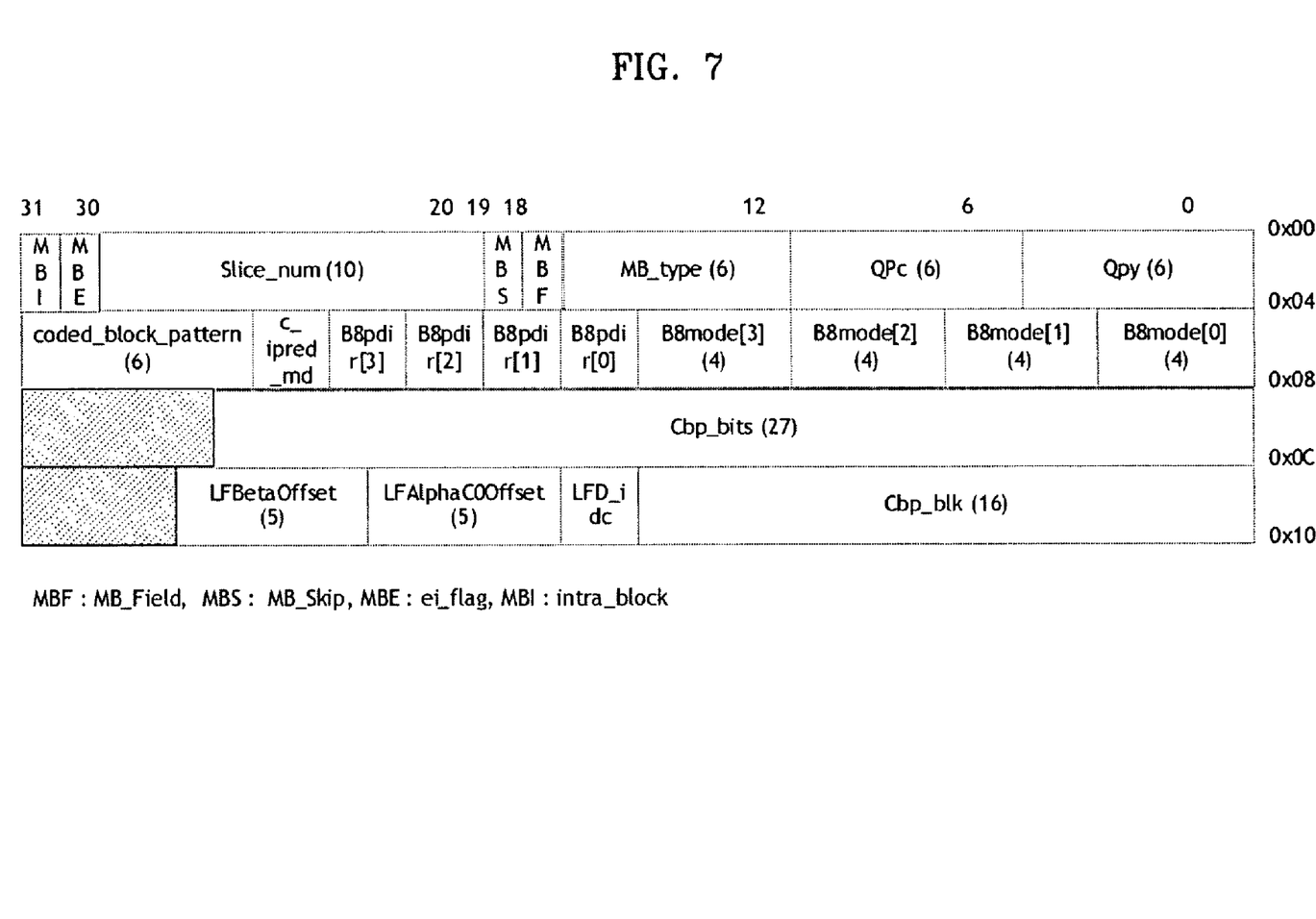
FIG. 7 illustrates a data structure for neighbor information stored in a memory.

The memory 303 can store information in macroblock or 4×4 block units. If the information is stored in macroblock units, the memory 303 can further store information in the format shown in FIG. 7, for example. In FIG. 7, information of a macroblock has been illustrated based on information of the macroblock being made up of 32 bits.

In FIG. 7, MBI represents a flag indicating whether a corresponding macroblock is an intrablock, MBE represents a flag indicating whether an error occurs in the corresponding macroblock, Slice_num represents a slice number (Slice_nr), MBS represents a skip flag indicating whether the corresponding macroblock is a skipped macroblock, MBF represents information indicating that the corresponding macroblock is a macroblock field (MB_Field), Qpc represents a quantization coefficient of chrominance, Qpy represents a quantization coefficient of luminance, coded_block_pattern represents a value indicating whether the coefficient of the corresponding macroblock is 0, c_ipred_md represents information indicating an intra-prediction mode of chrominance, the B8pdir[n] represent a prediction direction of an $n^{th}$ 8×8 block in the corresponding macroblock, the B8mode[n] represent type information of the $n^{th}$ 8×8 block in the corresponding macroblock, cbp_bits represents code block flag information used for context-based adaptive binary arithmetic coding (CABAC), LFBetaOFFset represents beta offset information used in the deblocking filter 312, LFAlphaCOOFFset represents AlphaCO offset information used in the deblocking filter 312, LFD_idc represents identification information of the deblocking filter 312, and CBP_blk represents code block flag information used for the deblocking filter 312.

As an example, when the neighbor information providing unit 305 reads information of 4 macroblocks, it reads information of a macroblock which has a format like that shown in FIG. 7, from the memory 303, 4 times.

The neighbor information providing unit 305 provides neighbor information used by the entropy-decoder 304, from among the read neighbor information, to the entropy-decoder 304, and transmits neighbor information used by the dequantization and inverse transformation unit 310, the motion prediction unit 311, and the deblocking filter 312, to the storage unit 306, for example.

The neighbor information used by the entropy-decoder 304 is defined by the below Table 1.

TABLE 1

| Neighbor information for entropy-decoder | Meaning |
|---|---|
| MvLX[ ] | Motion vector in 4 × 4 partition units for motion vector prediction |
| Intra4×4_pred_mode | Intra prediction mode in 4 × 4 partition units for obtaining 4 × 4 intra prediction mode |
| TotalCoeff | The number of non-zero coefficients in 4 × 4 partition units for VLC of residual data in context-based adaptive variable length coding (CAVLC) |
| MvdLX[ ] | Motion vector difference in 4 × 4 partition units for the context of Mvd of CABAC |
| ReIdx [ ][ ] | Reference index in 4 × 4 partition units for the context of reference indexs of CABAC and a reference picture referring to MV. |
| Skip_flag | Information in macroblock units for obtaining context information for Mb_skip |

TABLE 1-continued

| Neighbor information for entropy-decoder | Meaning |
| --- | --- |
| Mb_field | Macroblock field/frame information for obtaining a location of a neighboring block in an Mbaff and information for obtaining the context for a macroblock field (mb_field). |
| Mb_type | Information in macroblock units for obtaining context information for a macroblock type (Mb_type) |
| Cbp | Coded block flag for CABAC (1 bit flag per 8 × 8 block) |
| Cbp_bits | Coded block flag for CABAC (1 bit flag per 4 × 4 block for DC and AC coefficient) |
| C_ipred_mode | Intra chroma prediction mode (Intra_chroma_pred_mode) information for CABAC |
| Slice_nr | Slice number information for checking availability of a macroblock |
| Intra_block | Information indicating a macroblock is an intra- or inter-block |

Upon receiving the result of entropy-decoding the current macroblock from the entropy-decoder 304, the neighbor information providing unit 305 writes the entropy-decoded result to the memory 303 through the bus 302.

The storage unit 306 includes the respective first through third registers 307 through 309, which are consecutively connected and each assigned to a module, for example. In other words, the first register 307 is assigned to the dequantization and inverse transformation unit 310, the second register 308 is assigned to the motion prediction unit 311, and the third register 309 is assigned to the deblocking filter 312. Since the neighbor information stored in the first through third registers 307 through 309 is used as parameters for the corresponding modules, the first through third registers 307 through 309 may be defined as parameter registers.

Upon receiving neighbor information from the neighbor information providing unit 305, the first register 307 stores the received neighbor information. Here, the received neighbor information includes neighbor information used by the dequantization and inverse transformation Unit 310, the motion prediction unit 311, and the deblocking filter 312.

The first register 307 transmits the neighbor information used by the motion prediction unit 311 and the deblocking filter 312, from among its stored neighbor information, to the second register 308. The neighbor information used by the motion prediction unit 311 is defined by the below Table 2.

TABLE 2

| Neighbor information required for prediction | Meaning |
| --- | --- |
| Mb_field | Macroblock field/frame information for obtaining a location of a neighboring block in an Mbaff |
| Slice_nr | Slice number information for checking availability of a macroblock |

The second register 308 transmits the neighbor information used by the deblocking filter 312, from among its stored neighbor information, to the third register 309. The third register 309 then stores the received neighbor information. The neighbor information used by the deblocking filter 312 is defined by the below Table 3.

TABLE 3

| Neighbor information for the strength of the deblocking filter | Meaning |
| --- | --- |
| Mb_field | Macroblock field/frame information for obtaining a location of a neighboring block in an Mbaff |
| MvLX [ ] | Motion vector in 4 × 4 partition units used for calculating a filter strength |
| refAdr [ ] [ ] | Reference picture in 4 × 4 partition units used for calculating a filter strength |
| LFDisableIdc | Indicator for disabling the deblocking filter according to conditions |
| Mb_type | Intra/inter mode information used for calculating a filter strength |
| cbp_blk | Information indicated whether there is a non-zero coefficient of a macroblock in calculation of a filter strength (1-bit flag per 4 × 4 block only for luminance) |
| Slice_nr | Slice number information for checking availability of a macroblock |

The dequantization and inverse transformation unit 310 dequantizes the received entropy-decoded data with reference to the neighbor information stored in the first register 307, and inversely transforms the dequantized result. The result is residual information which is transmitted to the motion prediction unit 311 and, at the same time, for example, to the memory 303 through the bus 302.

Upon receiving the residual information of the current macroblock, the motion prediction unit 311 predicts motion between pictures with reference to the neighbor information stored in the second register 308, and reconstruct the original image with respect to the current macroblock using the predicted motion between the pictures and the residual information. The reconstructed result is transmitted to the memory 303 through the bus deblocking filter 312 and the bus 302.

The deblocking filter 312 deblocking-filters the reconstructed image with respect to the current macroblock, input from the motion prediction unit 311, outputs the deblocking-filtered result, and stores the same in the memory 303 through the bus 302.

Figure 8:
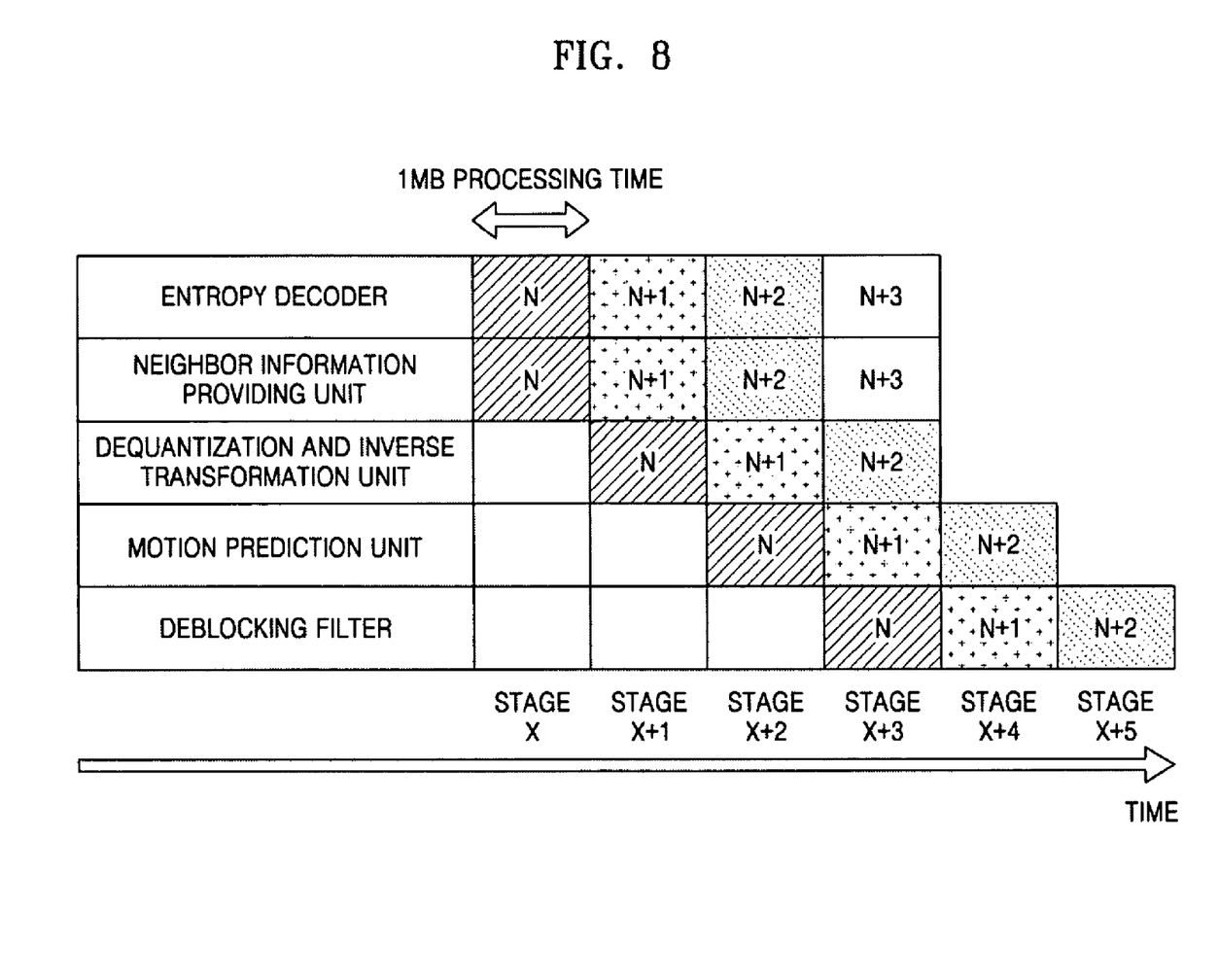
FIG. 8 illustrates a macroblock-based pipeline operation for modules, such as those shown in FIG. 3, according to an embodiment of the present invention.

A pipeline operation of the entropy-decoder 304, the neighbor information providing unit 305, the dequantization and inverse transformation unit 310, the motion prediction unit, and the deblocking filter 312 is further illustrated in FIG. 8, according to an embodiment of the present invention. As can be seen from the stages defined in FIG. 8, the entropy-decoder 304 and the neighbor information providing unit 305 process the same macroblock.

Referring to stage (X+3) of FIG. 8, in this embodiment of the present invention, when the entropy-decoder 304 and the neighbor information providing unit 305 operate on an (N+3)$^{th}$ macroblock, the dequantization and inverse transformation unit 310 operates on an (N+2)$^{th}$ macroblock, the motion prediction unit 311 operates on an (N+1)$^{th}$ macroblock, and the deblocking filter 312 operates on an N$^{th}$ macroblock.

Figure 9:
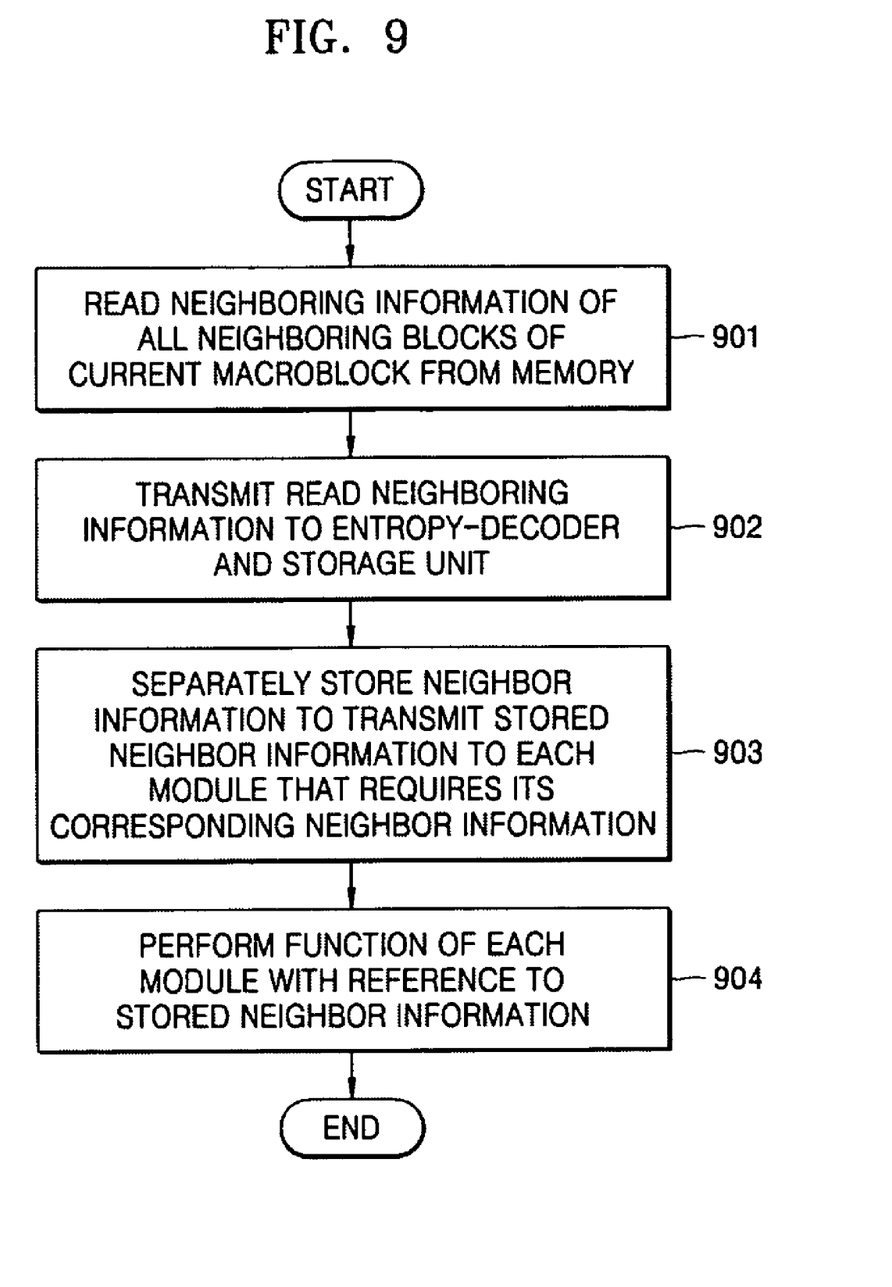
FIG. 9 is a flowchart illustrating a processing of neighbor information, according to an embodiment of the present invention.

FIG. 9 is a flowchart illustrating a processing of neighbor information, according to an embodiment of the present invention.

If at least one spatially neighboring macroblock of a current macroblock exists, the neighbor information providing unit 305 reads information of all neighboring macroblocks of the current macroblock, as used by each module of the video decoder, from the memory 303, e.g., such as in operation 901.

The neighbor information providing unit 305 provides information used by the entropy-decoder 304, from among the read information of the neighboring macroblocks (referring to as neighbor information), to the entropy-decoder 304, and at the same time, transmits neighbor information used by the dequantization and inverse transformation unit 310, the motion prediction unit 311, and the deblocking filter 312 to the storage unit 306, e.g., such as in operation 902.

The storage unit 306 separately stores the neighbor information transmitted from the neighbor information providing unit 305, to transmit its stored neighbor information to each module that uses its corresponding neighbor information, such as in operation 903. First, the storage unit 306 stores the neighbor information used by the dequantization and inverse transformation unit 310, the motion prediction unit 311, and the deblocking filter 312 as neighbor information that can be referred to by the dequantization and inverse transformation unit 310. The storage unit 306 then stores neighbor information used by the motion prediction unit 311 and the deblocking filter 312, as neighbor information that can be referred to by the motion prediction unit 311. Next, the storage unit 306 stores neighbor information used by the deblocking filter 312 as neighbor information that can be referred to by the deblocking filter 312. In this way, the storage unit 306 sequentially and separately stores the neighbor information transmitted from the neighbor information providing unit 305.

In operation 904, the entropy-decoder 304, the dequantization and inverse transformation unit 310, the motion prediction unit 311, and the deblocking filter 312 performs corresponding operations with reference to the stored neighbor information, such as the neighbor information stored in operation 903.

As described above, in a video decoder embodiment that operates each module in a pipeline form, neighbor information is accessed in macroblock units from a memory, the neighbor information is separately stored for each module's reference to the accessed neighbor information, and each module in the video decoder is allowed to refer to the stored neighbor information, thereby minimizing a number of accesses to the memory. Furthermore, it is possible to prevent bus collisions resulting from memory access to obtain neighbor information, and thereby prevent delays in data transmission caused by such collisions. Therefore, the processing speed of the video decoder can be improved.

Also, by minimizing the inefficient operation of the bus between the memory and each module and the number of memory accesses, the hardware modules of the video decoder can be designed more easily.

A computer readable code, such as coding, instructions, and programs, to implement the processing of neighbor information, and/or aspects thereof, according to embodiments of the present invention, can also be included in/on a medium, such as a computer readable recording medium, for example. The medium may be any data storage/transmitting device that can store data that can be thereafter be read by a computer. Examples of the medium may include any of a read-only memory (ROM), random-access memory (RAM), CD-ROMs, magnetic tapes, floppy disks, optical data storage devices, and carrier waves, for example.

The medium may also be distributed over network coupled computer systems so that the computer readable code is stored/transmitted and implemented in a distributed fashion.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An apparatus to process neighbor information in a video decoder having a plurality of modules operating in a pipeline form and a memory storing information in units of at least a block, comprising:
   a neighbor information providing unit to access respective information of at least one spatially neighboring block of a current block from the memory and provide the respective information as neighbor information; and
   a storage unit, distinguished from the memory, to store the respective neighbor information, provided by the neighbor information providing unit, and respectively output the stored respective neighbor information to each of plural modules, of the plurality of modules, for video decoding of the current block,
   wherein the memory is accessed through a memory data channel of the memory and the storage unit outputs the stored respective neighbor information to each of the plural modules outside of the memory data channel.

2. An apparatus to process neighbor information in a video decoder having a plurality of modules operating in a pipeline form and a memory storing information in units of at least a block, comprising:
   a neighbor information providing unit to access respective information of at least one spatially neighboring block of a current block from the memory and provide the respective information as respective neighbor information; and
   a storage unit, distinguished from the memory, to store the respective neighbor information, provided by the neighbor information providing unit, and respectively output the stored respective neighbor information to each of plural modules, of the plurality of modules, for video decoding of the current block, wherein the memory is accessed through a bus of the video decoder and the storage unit outputs the stored respective neighbor information to the plural modules outside of the bus.

3. The apparatus of claim 1, wherein the storage unit has a structure in which respective registers in the storage unit are assigned to respective modules and the respective registers in the storage unit store neighbor information for the current block for each of the plural modules.

4. The apparatus of claim 3, wherein the respective registers assigned to the respective modules are consecutively connected.

5. An apparatus to process neighbor information in a video decoder having a plurality of modules operating in a pipeline form and a memory storing information in units of at least a block, comprising:
   a neighbor information providing unit to access respective information of at least one spatially neighboring block of a current block from the memory and provide the information as neighbor information; and a storage unit, distinguished from the memory, to store the neighbor information, provided by the neighbor information providing unit, and output the stored neighbor information to at least one of the plurality of modules for video decoding, wherein the storage unit has a structure in which respective registers in the storage unit are assigned to respective modules, wherein the respective registers assigned to the respective modules are consecutively connected, and wherein when the plurality of modules comprise a dequantization and inverse transformation module, a motion prediction module, and a deblocking filter module, the storage unit further comprises:

a first register to store respective neighbor information used by the dequantization and inverse transformation module, the motion prediction module, and the deblocking filter module;

a second register to store neighbor information used by the motion prediction module and the deblocking filter module; and a third register to store neighbor information used by the deblocking filter module, wherein the first register transmits respective neighbor information used by the motion prediction module and the deblocking filter module to the second register, and the second register transmits respective neighbor information used by the deblocking filter module to the third register.

6. The apparatus of claim 5, wherein the first register, the second register, and the third register further store information processed in slice units, and the information processed in slice units is provided by a parser included in the video decoder.

7. An apparatus to process neighbor information in a video decoder having a plurality of modules operating in a pipeline form and a memory storing information in units of at least a block, comprising:

a neighbor information providing unit to access respective information of at least one spatially neighboring block of a current block from the memory and provide the information as neighbor information; and a storage unit, distinguished from the memory, to store the neighbor information, provided by the neighbor information providing unit, and output the stored neighbor information to at least one of the plurality of modules for video decoding, wherein the memory is accessed through a bus of the video decoder and the storage unit outputs the stored neighbor information to the plurality of modules outside of the bus, and wherein when the plurality of modules comprise an entropy-decoder module, a dequantization and inverse transformation module, a motion prediction module, and a deblocking filter module, the neighbor information providing unit provides respective neighbor information used by the entropy-decoder module, the dequantization and inverse transformation module, the motion prediction module, and the deblocking filter module.

8. The apparatus of claim 7, wherein the neighbor information providing unit accesses the memory to store an entropy-decoded result obtained from the entropy-decoder in the memory.

9. An apparatus to process neighbor information in a video decoder having a plurality of modules operating in a pipeline form, and a bus used to access a memory connected to the plurality of modules and to store information in units of at least a block, the apparatus comprising:

a neighbor information providing unit to access respective information of spatially neighboring blocks of a current block from the memory via the bus and provide the accessed respective information as respective neighbor information; and a storage unit, distinguished from the memory, to store the respective neighbor information provided by the neighbor information providing unit, for each of plural modules, of the plurality of modules, and respectively output the stored respective neighbor information to each of the plural modules for video decoding of the current block, wherein plural respective spatially neighboring blocks are read from the memory as the respective neighbor information of the spatially neighboring blocks of the current block.

10. The apparatus of claim 9, wherein all respective spatially neighboring blocks are read from the memory as the respective neighbor information of the spatially neighboring blocks of the current block.

11. An apparatus to process neighbor information in a video decoder having a plurality of modules operating in a pipeline form, and a bus used to access a memory connected to the plurality of modules and to store information in units of at least a block, the apparatus comprising:

a neighbor information providing unit to access respective information of spatially neighboring blocks of a current block from the memory via the bus and provide the accessed respective information as respective neighbor information; and a storage unit, distinguished from the memory, to store the respective neighbor information provided by the neighbor information providing unit, for each of plural modules, of the plurality of modules, and respectively output the stored respective neighbor information to each of the plural modules for video decoding of the current block, wherein the memory is accessed through a bus of the video decoder and the storage unit outputs the stored respective neighbor information to the plural modules outside of the bus.

12. A method for processing neighbor information, through a plurality of modules operating in a pipeline form, accessing a memory storing information in units of at least a block, the method comprising:

reading respective information of spatially neighboring blocks of a current block from the memory, as respective neighbor information;

storing in a storage unit, distinguishable from the memory, the respective neighbor information for respective modules; and transmitting the respective neighbor information from the storage unit to the plurality of modules, respectively, for video decoding, wherein plural spatially neighboring blocks are read from the memory as the respective neighbor information of the spatially neighboring blocks of the current block.

13. The method of claim 12, wherein all spatially neighboring blocks are read from the memory as the respective neighbor information of the spatially neighboring blocks of the current block.

14. A method for processing neighbor information, through a plurality of modules operating in a pipeline form, accessing a memory storing information in units of at least a block, the method comprising:

reading respective information of spatially neighboring blocks of a current block from the memory, as respective neighbor information;

storing in a storage unit, distinguishable from the memory, the respective neighbor information for respective modules; and transmitting the respective neighbor information from the storage unit to the plurality of modules, respectively, for video, wherein the memory is accessed through a bus of a corresponding video decoder and the storage unit outputs the stored respective neighbor information to the plural modules outside of the bus.

15. A method for processing neighbor information, through a plurality of modules operating in a pipeline form, accessing a memory storing information in units of at least a block, the method comprising:

reading respective information of spatially neighboring blocks of a current block from the memory, as respective neighbor information;

storing in a storage unit, distinguishable from the memory, the respective neighbor information for respective modules; and transmitting the respective neighbor information from the storage unit to the plurality of modules, respectively, for video decoding, wherein when the plurality of modules comprise a dequantization and inverse transformation module, a motion prediction module, and a deblocking filter module, the transmitting of the neighbor information comprises:

(a) storing in the storage unit respective neighbor information used by the dequantization and inverse transformation module, the motion prediction module, and the deblocking filter module among the read respective neighbor information;

(b) storing in the storage unit respective neighbor information used by the motion prediction module and the deblocking filter module among the respective neighbor information of (a); and (c) storing in the storage unit respective neighbor information used by the deblocking filter module among the respective neighbor information of (b).

16. The method of claim 15, where (a), (b), and (c) are performed in sequence.

17. At least one non-transitory computer readable medium comprising computer readable code to control at least one processing device to implement the method of claim 15.

18. At least one non-transitory computer readable medium comprising computer readable code to control at least one processing device to implement the method of claim 12.

19. The method of claim 18, wherein the memory is accessed through a bus of a corresponding video decoder and the storage unit outputs the stored neighbor information to the plurality of modules outside of the bus.

20. A video decoder means for decoding video through a plurality of module means operating in a pipeline form and a memory means for storing information in units of at least a block, comprising:

a means for accessing respective information of at least one spatially neighboring block of a current block from the memory means and for providing the respective information as respective neighbor information; and a storage means, distinguished from the memory means, for storing the respective neighbor information, as accessed by the means for accessing the respective information, for each of plural modules, of the plurality of modules, and for respectively outputting the stored respective neighbor information for the current block to each of the plural module means for decoding the current block of the video, wherein the memory means is accessed through a memory means data channel of the memory means and the storage means outputs the stored respective neighbor information to each of the plural module means outside of the memory means data channel.

21. A video decoder means for decoding video through a plurality of module means operating in a pipeline form and a memory means for storing information in units of at least a block, comprising:

a means for accessing respective information of at least one spatially neighboring block of a current block from the memory means and for providing the respective information as respective neighbor information;

a storage means, distinguished from the memory means, for storing the respective neighbor information, as accessed by the means for accessing the respective information, for each of plural modules, of the plurality of modules, and for respectively outputting the stored respective neighbor information for the current block to each of the plural module means for decoding the current block of the video, and the plurality of module means for performing the decoding of the current block of the video.

22. The method of claim 12, further comprising transmitting the read respective neighbor information to at least one module in the pipeline form, not of the plurality of modules, for the video decoding.

23. A system to process neighbor information in a video decoder, comprising:

a plurality of modules configured in a pipeline and to video decode a current block, based upon at least one spatially neighboring block of the current block, according to respective neighbor information of the current block output to each of the plurality of modules; and a providing system to access the respective neighbor information of the current block for each of the plurality of modules from a first memory, to store accessed respective neighbor information for each of plural modules, of the plurality of modules, in a second memory, and to selectively output the respective stored neighbor information of the current block to each of the plural modules for respective decoding operations of each of the plural modules for the video decoding of the current block, wherein the first memory is accessed through a first memory data channel of the first memory and the second memory outputs the stored accessed respective neighbor information to each of the plural modules outside of the first memory data channel.

24. The system of claim 23, further comprising the second memory configured to have at least one register assigned to each of the plural modules, with each register respectively storing the respective stored neighbor information for the current block for a corresponding module, of the plural modules, to perform a respective decoding operation for the current block.

25. The system of claim 23, wherein the providing system selectively outputs accessed respective neighbor information of the current block to one of the plurality of modules, excluding the plural modules, for a respective decoding operation of the one module, for the video decoding of the current block.

26. A method of video decoding with neighbor information, comprising:

accessing respective neighbor information of a current block from a first memory, as at least one spatially neighboring block of the current block, for each of a plurality of modules in a pipeline to decode the current block;

selectively outputting the respective neighbor information of the current block to each of the plurality of modules for respective decoding operations of each of the plurality of modules;

storing the accessed respective neighbor information for each of plural modules, of the plurality of modules, in a second memory, wherein the selective outputting of the respective neighbor information of the current block includes outputting the respective neighbor information to each of the plural modules from the second memory; and video decoding in the pipeline the current block by the plurality of modules based on the respective neighbor information of the current block output to each of the plurality of modules, wherein the first memory is accessed through a first memory data channel of the first memory and the outputting of respective neighbor information to each of the plural modules is performed outside the first memory data channel.

27. The method of claim 26, wherein the selective outputting of the respective neighbor information of the current block includes outputting the accessed respective neighbor information of the current block to one of the plurality of modules, excluding the plural modules, for a respective decoding operation of the one module.

28. At least one non-transitory computer readable medium comprising computer readable code to control at least one processing device to implement the method of claim 26.

* * * * *

UNITED STATES PATENT AND TRADEMARK OFFICE
CERTIFICATE OF CORRECTION

| | | |
|---|---|---|
| PATENT NO. | : 7,929,614 B2 | Page 1 of 1 |
| APPLICATION NO. | : 11/270626 | |
| DATED | : April 19, 2011 | |
| INVENTOR(S) | : Daesung Cho et al. | |

It is certified that error appears in the above-identified patent and that said Letters Patent is hereby corrected as shown below:

Column 13, Line 51, In Claim 19, delete "method" and insert -- medium --, therefor.

Signed and Sealed this
Thirty-first Day of January, 2012

David J. Kappos
*Director of the United States Patent and Trademark Office*